United States Patent [19]

Le Calvez et al.

[11] Patent Number: 5,113,368
[45] Date of Patent: May 12, 1992

[54] CIRCUIT FOR DELAYING AT LEAST ONE HIGH BIT RATE BINARY DATA TRAIN

[75] Inventors: Michel Le Calvez, Boulogne Billancourt; Michel Peruyero, Paris, both of France

[73] Assignee: Alcatel Thomson Faisceaux Hertziens, Paris, France

[21] Appl. No.: 273,469

[22] Filed: Nov. 17, 1988

[30] Foreign Application Priority Data

Nov. 18, 1987 [FR] France ............... 87 15945

[51] Int. Cl.⁵ .............................. G06F 5/06
[52] U.S. Cl. ................... 395/250; 364/939.1; 364/939.4; 364/948.31; 364/550; 364/DIG. 2
[58] Field of Search ............ 364/200 MS File, 726, 364/900 MS File

[56] References Cited

U.S. PATENT DOCUMENTS 3,736,568  6/1973  Snook ............... 364/200
4,546,444  10/1985  Bullis ............... 364/550

FOREIGN PATENT DOCUMENTS 0018518  4/1980  European Pat. Off.
2086623  9/1981  United Kingdom.

OTHER PUBLICATIONS

Specification sheet for RCA/RTC 7008 FIFO register, Jan. 1986.
Vol. 9, No. 190, Aug. 7, 1985 Japan.

*Primary Examiner*—Gareth D. Shaw
*Assistant Examiner*—Maria N. Von Buhr
*Attorney, Agent, or Firm*—Christie, Parker & Hale

[57] ABSTRACT

A circuit for delaying at least one high bit rate data train, the circuit comprising: first (25) and second (26) first-in-first-out (FIFO) type registers having "m" inputs and "n" words in series; a binary counter (27) delivering a most significant bit signal (MSB); a write-/read control circuit (28) for controlling writing and reading in said register (25, 26) and comprising: a circuit for switching a clock signal (H) alternatively to each of the two registers (25, 26) in order to write in one of the two registers while simultaneously reading from the other, and vice versa; a circuit (33, 34) for dynamically resetting said registers (25, 26) to zero immediately prior to each write stage; and a circuit (35) for generating an output enable signal for controlling said registers to enable the previously input data to be output therefrom after a delay of "n" clock periods since the beginning of a write stage.

6 Claims, 3 Drawing Sheets

PRIOR ART

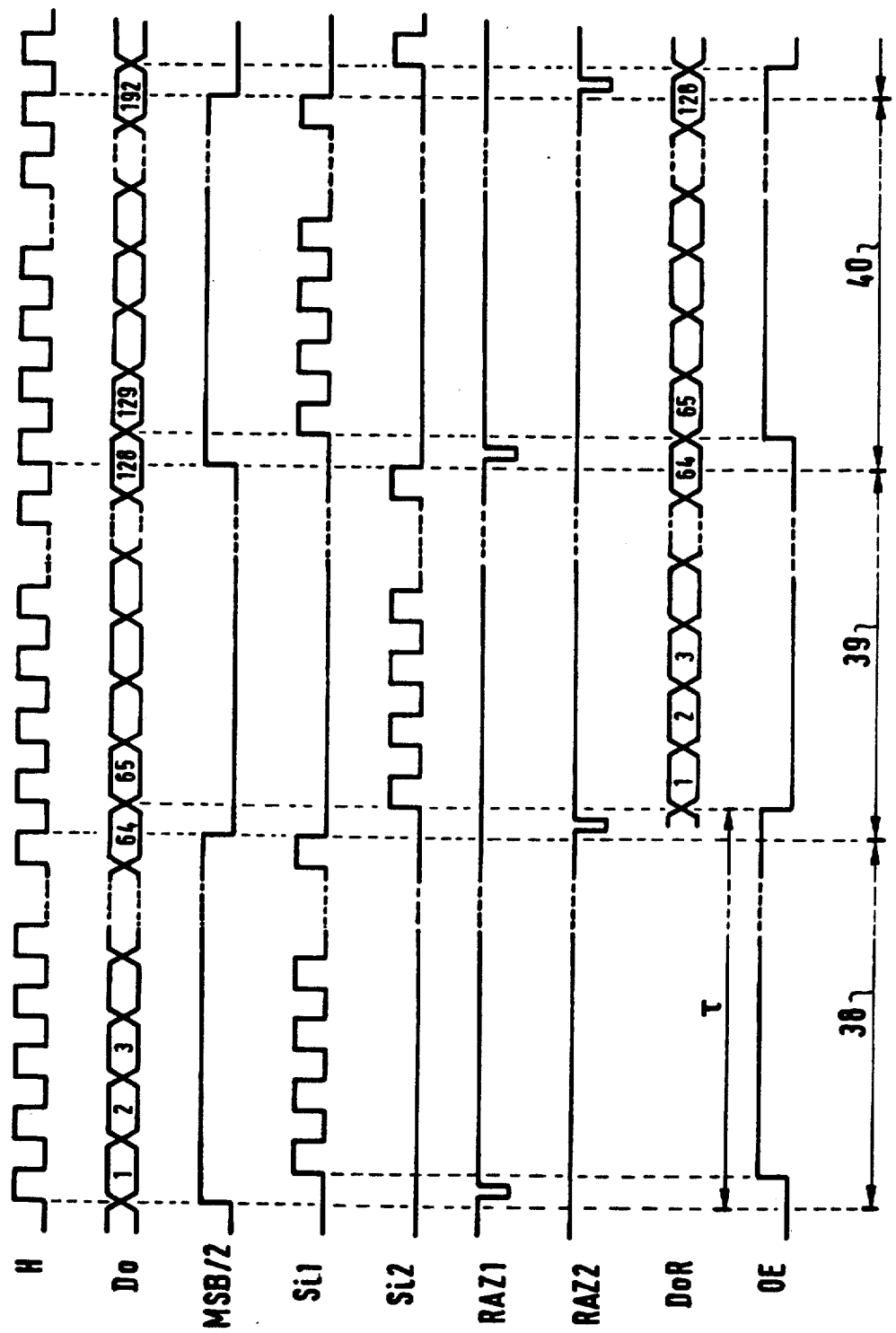

CIRCUIT FOR DELAYING AT LEAST ONE HIGH BIT RATE BINARY DATA TRAIN

The invention relates to a circuit for delaying at least one high bit rate binary data train.

The invention serves to provide an "n" clock period synchronous shift register suitable for delaying one or "m" high bit rate binary data trains (e.g. at rates of 25 megabits per second (Mbit/s) to 40 Mbit/s) by "n" bits.

BACKGROUND OF THE INVENTION

In prior art circuits, such a delay is obtained by means of a D-type bistable. A distinction must then be made between low bit rates and high bit rates:

at low bit rates ($\leq 2$ Mbit/s), metal oxide semiconductor (MOS) technology is used; shift registers having lengths of 64, 128, ..., 1024 bits are available in single 16-pin packages;

at higher bit rates, it is necessary to use fast particular "ECL 10000" or even "ECL 100 K".

However, since power consumption increases very fast with speed, and with the number of bistables, the number of D-type bistable per package decreases and it is difficult to obtain as many as 8 per package. This gives rise to too large a number of packages. For example, 128 packages each having 8 bistables are required for a delay of 1024 bits ($128 = 1024/8$); or 48 8bit packages are required to delay 6 binary trains by 64 bits ($48 = 6 \times 8$).

Thus, whenever "n" and "m" are large, prior art circuits make use of a programmable divide-by-n counter in association with two identical random access memories (RAMs), with the binary counter sequentially addressing the data bits in one of the RAMs for writing purposes while simultaneously addressing the other RAM for reading purposes, and then sequentially addressing the RAMs for opposite purposes The desired delay is obtained by the division ratio (n) of the counter.

Such a circuit suffers from numerous drawbacks, and in particular:

it includes an address bus to be distributed;

it requires a multiplexer for large capacities since the input and the output to the data bus are then common and as a result additional registers need to be used; and when switched on, the memories contain random values and as a result it is necessary to provide for an initialization stage in which a signal is sent to all possible address locations.

SUMMARY OF THE INVENTION

In order to mitigate these drawbacks, the present invention provides a circuit for delaying at least one high bit rate data train, and comprising:

first and second first-in-first-out (FIFO) type registers having "m" inputs and "n" words in series;

a binary counter delivering a most significant bit signal (MSB);

a write/read control circuit for controlling writing and reading in said registers and comprising:

- a circuit for switching a clock signal alternatively to each of the two registers in order to write in one of the two registers while simultaneously reading from the other, and vice versa;
- a circuit for dynamically resetting said registers to zero immediately prior to a write stage; and
- a circuit for generating an output enable signal for controlling said registers to enable the previously input data to be output therefrom after a delay of "n" clock periods since the beginning of each write stage.

Such a circuit has the following advantages, in particular:

it is simple to implement; and it is cheap and consumes little power.

More precisely, the clock signal switching circuit comprises:

a divide-by-two circuit for obtaining a signal MSB/2 by dividing the signal MSB by two in order to equalize write and read times in the registers;

a bistable for synchronizing said MSB/2 signal on the clock signal H which is at the same rate as the incoming data Do, ..., Dm; and two AND gates for generating signals Si1 (or So2) and Si2 (or Sol) which are the write signals for the first and second FIFO registers respectively, and conversely the read signals for the second and first FIFO registers respectively.

The circuit for resetting the registers to zero comprises:

two monostables for generating instantaneous FIFO register initialization pulses RAZ1 and RAZ2 immediately before their respective write stages.

The circuit for generating an output enable signal comprises:

a pointer bistable for delaying the MSB/2 signal so that each FIFO register is output enabled in succession (OE) in order to enable the information therein to be output.

Advantageously, each FIFO register includes a plurality of FIFO packages connected in series, thereby increasing the delay. Further, each FIFO register may comprise a plurality of packages in parallel, thereby making it possible to increase the number of inputs.

BRIEF DESCRIPTION OF THE DRAWINGS

An embodiment of the invention is described by way of example with reference to the accompanying drawings, in which:

FIG. 3 is a waveform diagram showing signals at various points in the circuits shown in FIG. 2.

MORE DETAILED DESCRIPTION

Figure 1:
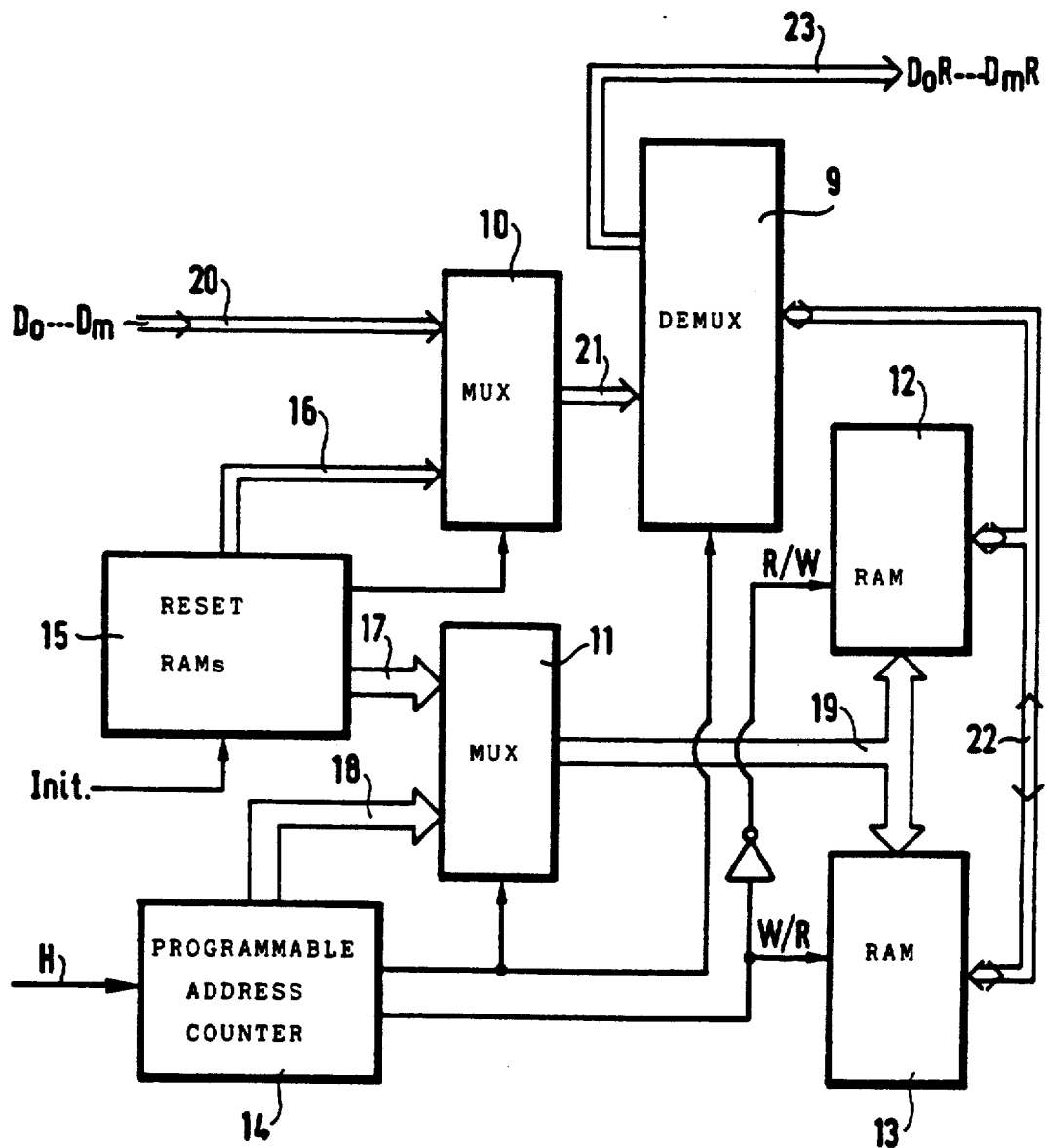
FIG. 1 is a block diagram of a prior art circuit.

The prior art device shown in FIG. 1 comprises:
first and second multiplexers 10 and 11;
first and second random access memories (RAM) 12 and 13;
an optional demultiplexer 9 when large capacities are involved;
a programmable address counter 14; and
a counter 15 for resetting the RAMs 12 and 13 to zero.

These various circuits are interconnected by the following links:
address buses 17, 18, and 19;
data buses 16, 20, 21, 22, and 23;
a clock signal "H";
an initialization signal "Init";
a write/read signal "W/R";
a read/write signal "R/W"; and
control signals applied to the multiplexers and to the demultiplexer.

In such a circuit, data (Do, ..., Dm) from bus 20 is stored in the first sequential access RAM 12 by virtue of the address counter 14 being incremented by a clock signal H.

When the first RAM 12 is completely filled, the same address counter 14 is used to direct the data into the second RAM 13, while the first RAM 12 is being read simultaneously.

This circuit requires:

a system for resetting the memories to zero on initialization requiring the use of a reset to zero counter 15 and two multiplexers 10 and 11;

an optional demultiplexer 9 in the event that the inputs and outputs of the RAMs 12 and 13 are common; and the address bus 19 to be applied to both RAMs 12 and 13, and, for large "m" and "n", the bus must be carefully positioned on the printed circuit board (PCB), thereby taking up a great deal of space, and this may require the use of a multilayer PCB.

Figure 2:
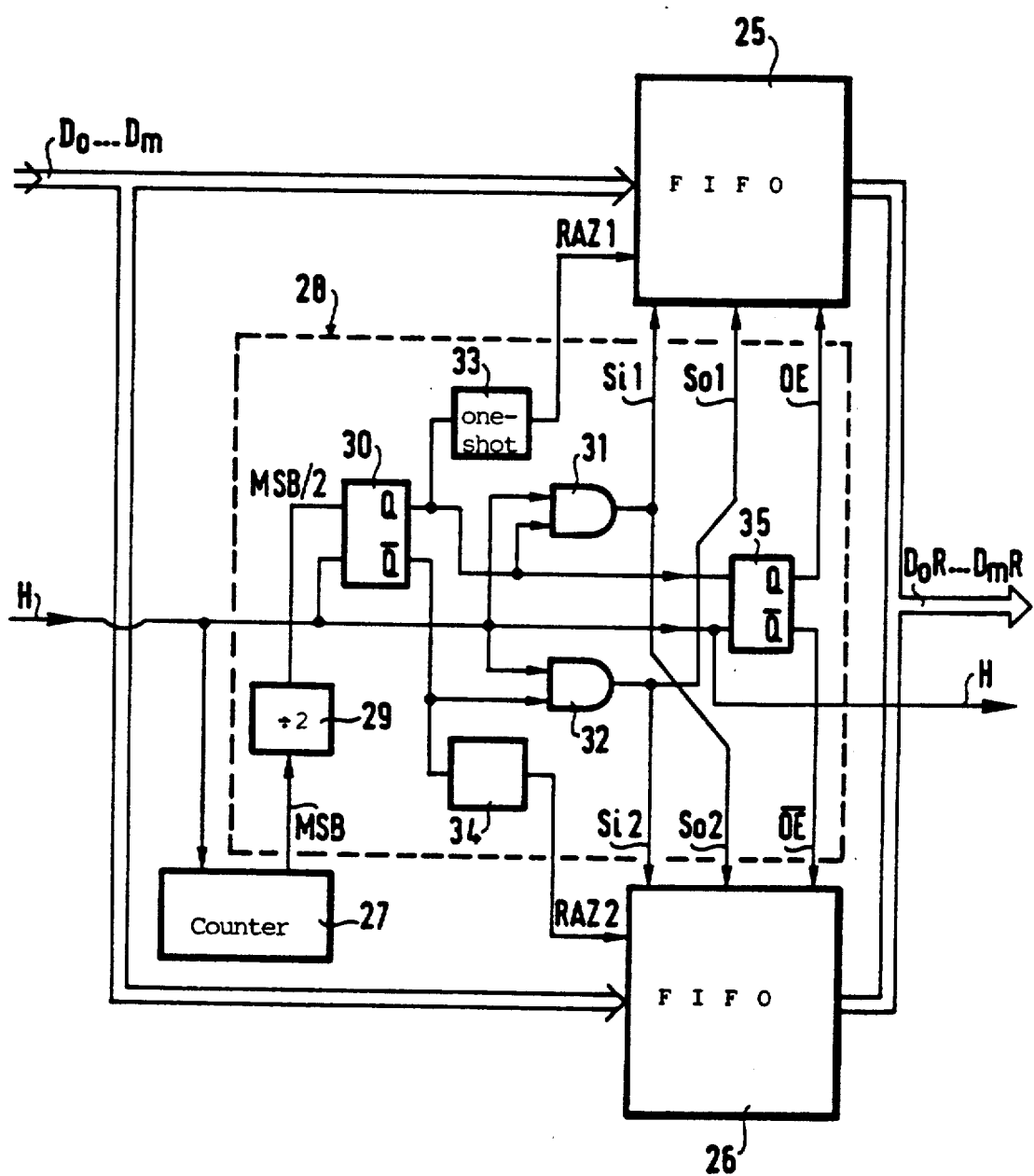
FIG. 2 shows a circuit in accordance with the invention.

In contrast, the circuit of the invention, as shown in FIG. 2, obtains the same results without requiring the use of the above-mentioned circuits. It has the following characteristics:

the two RAMs are replaced by two first-in-first-out (FIFO) registers 25 and 26;

the address buses are omitted, only a most significant bit (MSB) signal corresponding to the desired delay $\tau$ is retained for the purpose of switching between the write clock and the read clock (with the period T of the MSB signal being equal to $\tau$);

the multiplexers are omitted;

the input/output demultiplexer is omitted; and is replaced by the three-state function of the FIFO outputs;

the initialization counter is omitted as are the associated multiplexers, and it is replaced by a pair of reset to zero monostables which initialize the FIFO registers dynamically immediately before they are written to; and it is easily cascadable and extensible:
for "n" delay bits; and
for "m" data trains.

The circuit according to the insertion thus comprises:
first and second FIFO registers 25 and 26;

a programmable address counter 27 suitable for obtaining an MSB signal;

a circuit 28 for controlling writing and reading in the two registers 25 and 26 and including, in particular:

a divide-by-two circuit 29 for obtaining an MSB signal divided by two (MSB/2) in order to equalize write and read times in the registers 25 and 26;

a bistable 30 for synchronizing this MSB/2 signal with the clock signal H which has the same rate as the incoming data Do, ..., Dm;

two AND gates 31 and 32 for generating signals Si1 (or So2) and Si2 (or So1) which are the write signals for the first and second FIFO registers 25 and 26 respectively, and conversely the read signals for the second and first FIFO registers 26 and 25 respectively; and two monostables 33 and 34 for generating pulses RAZ 1 and RAZ 2 for instantaneously initializing the FIFO registers 25 and 26 immediately before their respective write stages; and a pointer bistable 35, e.g. of the D-type, for delaying the signal MSB/2 so that the FIFO registers are put successively into an output state in order to output the information stored therein (by putting an output enable signal OE to a low state).

Each FIFO register 25 and 26 may be constituted by a plurality of FIFO cells connected in series and/or connected in parallel. If the number of FIFO cells in series is increased then the delay between the input data Do, ..., Dm and the delayed output data DoR, ..., DmR can be increased. If the number of FIFO cells in parallel is increased, then the number of data inputs Do, ..., Dm can be increased.

In operation, input data Do, ..., Dm is written to the first FIFO register 25 (by applying a write clock thereto).

Thereafter input data is written to the second FIFO register 26 while the previously filled first FIFO register 25 is read.

Then, conversely, data is written to the first FIFO register 25 while the second FIFO register 26 is being read, and so on, ... .

FIG. 3 is a waveform diagram showing how the various above-described signals vary over time. These signals vary as follows:

during an initial stage 38, data Do (1 to 64) is written to the first FIFO register 25 after it has been initialized (pulse RAZ1);

during a second stage 39, data Do (65 to 128) is written to the second FIFO register 26 after it has been initialized (pulse RAZ2) while data DoR (1 to 64) as delayed by delay r is read simultaneously from the first FIFO register 25; and during a third stage 40, data Do (129 to 192) is written to the first register 25 after it has been initialized (RAZ1) and simultaneously data DoR (65 to 128) as delayed by delay r is read from the second FIFO register 26.

When the output enable signal OE is at a low level, data DoR, ..., DmR (1 to 64 and 129 to 192) can be read from the first FIFO register 25.

When the output enable bar signal $\overline{OE}$ is at a low level, then the data DoR, ..., DmR (65 to 128, ..., and 193 to 256) can be output from the second FIFO register 26.

In a particular example, six binary trains having a maximum of 64 bits each at a data rate of 25 MHz are delayed using seven packages, namely:

two binary counters (e.g. Fairchild or Motorola type F163);

two 9-bit × 64 FIFO registers (e.g. RTC or RCA type HC Mos 7030);

one D-type bistable package (e.g. a Motorola or Fairchild type F112); and two AND (or NAND) packages (e.g. Motorola or Fairchild FOO type).

Naturally, the present invention has been described and shown purely by way of preferred example and its component parts could be replaced by equivalent parts without thereby going beyond the scope of the invention.

We claim:

1. A circuit for delaying at least one high bit rate data train for a delay period of T bit periods, said circuit comprising:

first and second mxn first-in-first-out (FIFO) registers, each said FIFO register capable of storing up to "n" "m"-bit input words and comprising:
a "reset" terminal responsive to a register initialization (RAZ) signal,
an "m" bit input terminal,
an "m" bit output terminal, an output enable terminal responsive to an output enable (OE) signal, a shift-in terminal for causing the m-bit input word currently appearing at said input terminal to be input to the FIFO register in response to m shift-in pulses (SI) appearing at said shift-in terminal, and a shift-out terminal for causing the first m-bit word remaining in the FIFO register to be output from the "m" bit output terminal of the register in response to m shift-out (SO) pulses appearing at said shift-out terminal while said output enable signal is applied to said output enable terminal;

a common data input directly coupled to the input terminals of both the first and second FIFO registers;

a common data output directly coupled to the output terminals of both the first and second FIFO registers;

counter means response to a clock signal for delivering a synchronization (MSB/2) signal having a period equal to twice said delay period T, with $T \leq n$ bit periods, said clock signal operating at a bit rate substantially equal to that of the data input; and a write/read control circuit responsive to said synchronization signal and to said clock signal for controlling input (writing) to and output (reading) from said FIFO registers and comprising a first circuit for
  alternatively supplying a sequence of m pulses derived from said clock signal
  (a) to both the shift-in terminal of a first said FIFO register and the shift-out terminal of a second said FIFO register and
  (b) to both the shift-out terminal of the first FIFO register and to the shift-in terminal of the second FIFO register, in order to thereby write in one of the two FIFO registers during a write stage of said one FIFO register while simultaneously reading from the other of the two FIFO registers during a read stage of said other register, and vice versa, the first circuit comprising
    shift-in timing logic responsive to the synchronization signal and the lock signal for alternately generating a first sequence of shift-in pulses Si1 at a first timing logic output and a second sequence of shift-in pulses Si2 at a second timing logic output with each of said sequences being delayed relative to said synchronization signal by one bit period of said clock signal, said first timing logic output being directly coupled both to the shift-in terminal of the first FIFO register and to the shift-out terminal of the second FIFO register and said second timing logic output being directly coupled both to the shift-out terminal of the first FIFO register and to the shift-in terminal of the second FIFO register, whereby only one of said FIFO registers is in its write stage in which it is responsive to any input data words appearing at said common data input, a second circuit for dynamically resetting an alternately selected one of said FIFO registers to zero after the synchronization signal changes state and immediately prior to the generation of a respective one of said delayed sequences of shift-in pulses by said fist circuit during a respective write stage, the second circuit comprising
  initialization logic responsive to said synchronization signal for applying an initialization pulse to the reset terminal of the selected FIFO register immediately prior to the application of said respective sequence of shift-in pulses to the shift-in terminal of said selected FIFO register, whereby each FIFO register is cleared of all data still remaining in the FIFO register at the end of its respective write stage, and a third circuit for supplying a respective said output enable signal only to the non-selected one of said FIFO registers to enable data stored therein to be output therefrom during a "T" clock period read stage following a delay of "T" clock periods since the beginning of the write stage of said non-selected FIFO register, the third circuit comprising
  output selection logic responsive to the clock signal and to the synchronization signal for alternately generating a first output enable signal associated with the first FIFO register and a second output enable signal associated with the second FIFO register, in synchronism with the generation of the respective sequences of shift-out pulses by said first circuit.

whereby only the FIFO register in which data delayed by said delay period T had been stored during an immediately prior read stage is enabled to output its thus-stored and delayed data onto said common data output free from interference from any data remaining in the other FIFO register.

2. A circuit according to claim 1, wherein the first circuit further comprises:
  a counter bistable for synchronizing said synchronization signal to the clock signal; and
  two AND gates for generating said two sequences of shift-in pulses Si1 and Si2.

3. A device according to claim 1, wherein the second circuit further comprises two monostables each associated with a difference said FIFO register for alternately generating respective first and second initialization pulses immediately before the respective write stages.

4. A circuit according to claim 2, wherein the third circuit further comprises a pointer bistable for delaying the synchronization signal.

5. A circuit according to claim 1, wherein each FIFO register comprises a plurality of FIFO packages connected in series, thereby enabling the delay to be increased.

6. A circuit according to claim 1, wherein each FIFO register comprises a plurality of packages in parallel, thereby enabling the number of inputs to be increased.

* * * * *

UNITED STATES PATENT AND TRADEMARK OFFICE
CERTIFICATE OF CORRECTION

PATENT NO. : 5,113,368

DATED : May 12, 1992

INVENTOR(S) : Michel Le Calvez; Michel Peruyero

It is certified that error appears in the above-identified patent and that said Letters Patent is hereby corrected as shown below:

```
Column 1, line 20, before "particular" insert -- technologies
          such as emitter coupled logic (ECL), and in --.
Column 1, line 28, before "packages" change "8bit" to
          -- 8-bit --.
Column 1, line 38, after "purposes" insert a period.

Column 2, line 17, before "which" change "(or Sol)" to
          -- (or S01) --.

Column 3, line 43, change "insertion" to -- invention --.

Column 4, line 27, after "delay" change "r" to -- τ --.
Column 4, line 33, after "delay" change "r" to -- τ --.

Column 6, line 9, change "fist" to -- first--.
```

Signed and Sealed this

Nineteenth Day of October, 1993

Attest:

BRUCE LEHMAN

*Attesting Officer*    *Commissioner of Patents and Trademarks*